United States Patent [19]

Zhadanov

[11] 4,374,444
[45] Feb. 22, 1983

[54] WATER DRIVEN BRUSH FOR CARS AND THE LIKE

[76] Inventor: Sam Zhadanov, 2944 W. 5th St., Apt. 20 J, Brooklyn, N.Y. 11224

[21] Appl. No.: 241,592

[22] Filed: Mar. 9, 1981

[51] Int. Cl.³ ............................................. A46B 13/02
[52] U.S. Cl. ...................................................... 15/29
[58] Field of Search ...................... 15/24, 28, 29, 97 R; 173/168, 169

[56] References Cited

U.S. PATENT DOCUMENTS 4,084,281  4/1978  Smith ...................................... 15/29
4,228,558  10/1980  Zhadanov ............................... 15/29

FOREIGN PATENT DOCUMENTS 261422  4/1968  Austria .................................... 15/29

Primary Examiner—Edward L. Roberts
Attorney, Agent, or Firm—Ilya Zborovsky

[57] ABSTRACT

A water vortex brush has a rotor connected with a brush member and rotatable by a water supplied to the rotor and exiting from the brush member. The water forms a vortex in the interior of the rotor, and the latter is provided with an opening communicating with outside air so that the outside air is aspirated by a negative pressure existing in the central area of the rotor and thereby nullifies the same. The brush has water discharge openings radially offset relative to the air aspirating opening. A rotatable and angularly bent handle, forming simultaneously a water supply conduit, is provided. The bristles of the brush member are selected so as to form a very thin layer at their periphery under the action of a centrifugal force during the operation of the brush.

8 Claims, 5 Drawing Figures

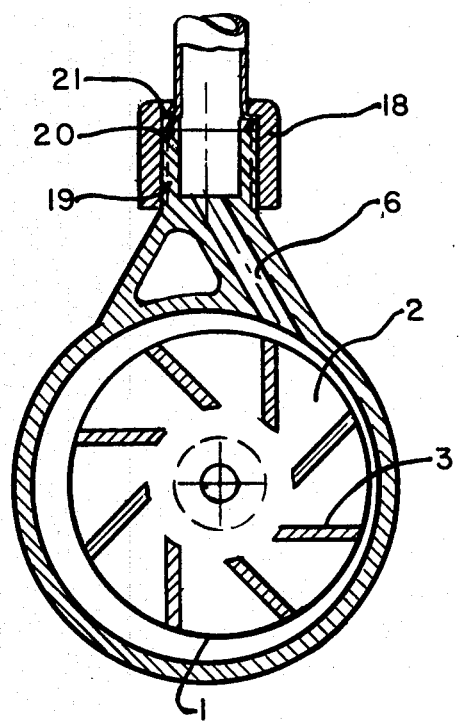
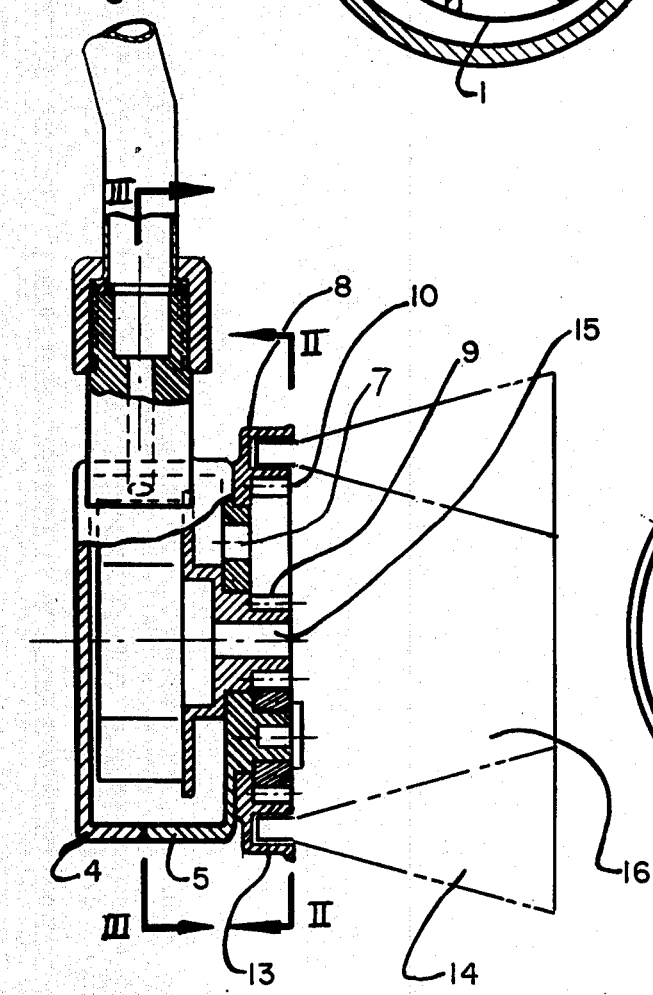
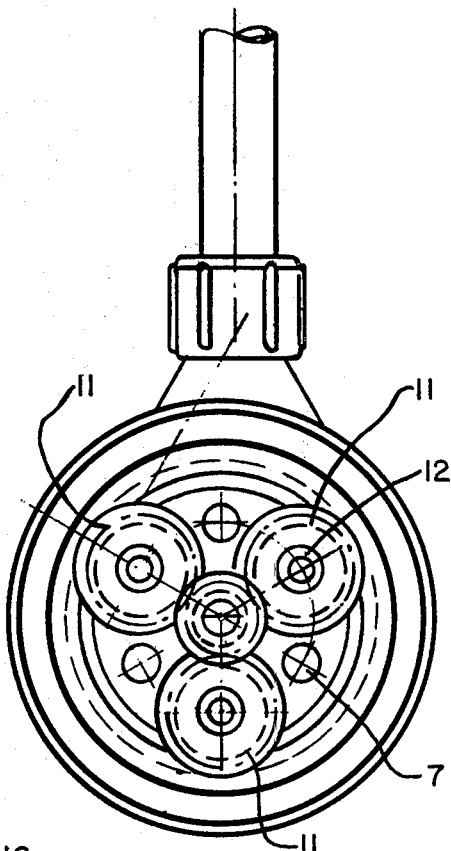

WATER DRIVEN BRUSH FOR CARS AND THE LIKE

BACKGROUND OF THE INVENTION

The present invention relates to a water vortex brush, for example for cars and the like.

Water brushes are known in the art. One of such brushes is disclosed, for example, in the U.S. Pat. No. 4,228,558. The water brush of this patent has a rotor which carries a brush member and essentially differs from known brushes in that it provides a high degree of impelling force to blades of the rotor. In order to attain this object, the rotor is arranged so that its blades do not extend fully across the rotor. This provides a place for the spent water to go so that the water does not exert a dragging force on the rotor and provides, especially at the center or near the axis of the rotor, the high speed exhaust and whirl or vortex effect. It causes an additional high speed impulse for the rotor blades. It is, however, recognized that any vortex has a zone of negative pressure located right near its axis. Such a zone of negative pressure can aspirate the water and thereby diminish the vortex effect and render resistance to the rotor rotation. This undesirably affects the torque and power of the rotor.

SUMMARY OF THE INVENTION

Accordingly, it is an object of the present invention to provide a water vortex brush which avoids the disadvantages of the prior art.

In keeping with these objects and with others which will become apparent hereinafter, one feature of the present invention resides, briefly stated, in a water vortex brush in which a zone of negative pressure which conventionally forms in the region of axis of a brush rotor is eliminated by the provision of preventing means.

The preventing means may be formed as a through going passage which communicates the interior of the rotor in its axial region, with outside air so that the outside air can be aspirated into the above mentioned region and thereby prevent formation of the negative pressure zone. As a result of this, the water no longer is urged into the axial region of the rotor and does not reduce the vortex effect and decrease the resistance to rotor rotation. No losses of torque and power of the rotor thereby take place.

In accordance with another advantageous feature of the present invention, outlet ports of a brush member which rotate together with the rotor are arranged so that water exits through the brush member radially outwardly of the path of aspirating the outside air into the axial region of the rotor. This prevents interference of the water with the aspirated air.

Still another advantageous feature of the invention resides in the fact that a tubular handle which simultaneously forms a water supply conduit has two sections arranged at an angle relative to one another and is pivotally connected with a housing of the brush so that in one position of the handle the brush member is located inside the angle between the handle portions, whereas in another position the brush member is located outside the same. As will be explained hereinbelow, this provides for very convenient cleaning of different surfaces with the brush having the same handle.

A further advantageous feature of the present invention is that the handle is provided with an elastic wall forming a soap-like medium containing reservoir and having an outlet pipe, so that upon compressing of the elastic wall, the soap-like medium is squeezed from the reservoir through the pipe toward an area which is close to the brush member.

Finally, still a further advantageous feature of the present invention is that the brush member has an elongated threads whose length and elasticity is such that a centrifugal force developed during the rotation of the brush member deflects the threads radially outwardly and they form, at the periphery of the brush member, a thin layer of the threads. Such a thin layer can be introduced into very narrow spaces so as to clean such areas which are difficult to access.

The novel features which are considered as characteristic for the present invention are set forth in particular in the appended claims. The invention itself, however, both as to its construction and manner of operation will be best understood from the following description which is accompanied by the following drawings.

BRIEF DESCRIPTION OF THE DRAWINGS

FIG. 1 is a view showing a head of the inventive brush in a section taken along an axis of a rotor;

FIG. 2 is a plan view of the rotor located in a portion of a housing;

FIG. 3 is a view showing elements of transmission between the rotor and a brush member;

DESCRIPTION OF A PREFERRED EMBODIMENT

Figure 4:
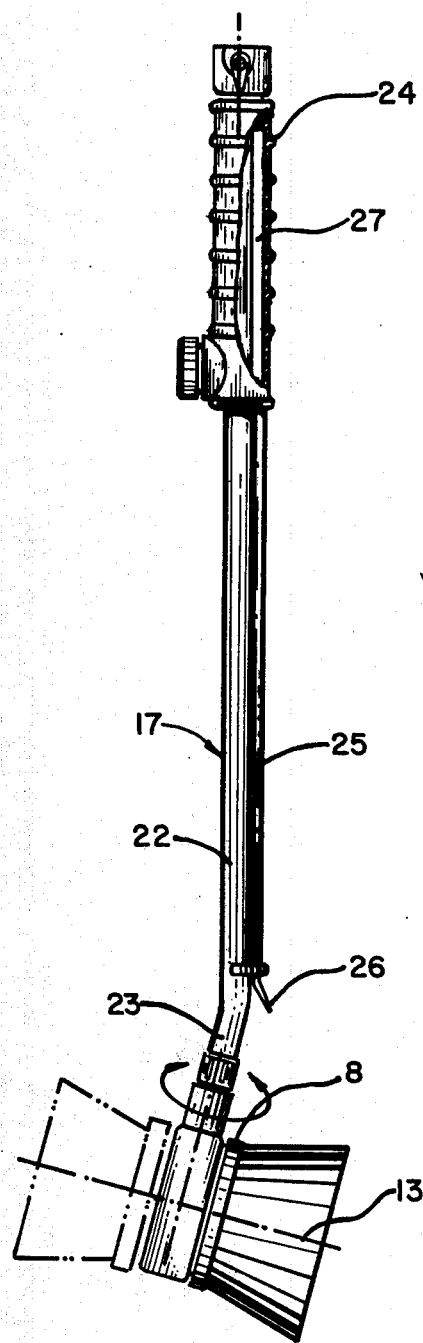
FIG. 4 is a view showing the head attached to a water supply pipe serving as a handle.

A water vortex brush in accordance with the present invention has a rotor which is identified in toto by reference numeral 1 and has a base 2 and a plurality of blades 3. The rotor 1 is arranged in a housing which has an upper housing part 4 and a lower housing part 5 connectable with one another by conventional methods, for example by glueing.

As can be seen from FIG. 2, the rotor 1 is arranged so that the radially inner ends of the blades 3 do not extend to the axis of the rotor but terminates at a distance from the latter. Moreover, the rotor 1 is arranged so that it is eccentric to the cylindrical housing parts 4 and 5 and a space of a variable cross section is formed between the outer ends of the blades and the inner wall of the housing parts. A water supply passage 6 is formed in the housing parts 4 and 5. Several water discharge openings are provided in a lower wall of the housing part 5 and identified by reference numeral 7.

An intermediate platform 8 is rotatably connected with the housing part 5. The lower wall of the housing part 5 has a central opening through which an extension of the rotor 1, provided with a sun gear 9 extends. The platform 8 is annular and provided with inner teeth 10. Planetary gears 11 are mounted on stationary posts 12 attached to the housing part 5. The planetary gears 11 engage with the sun gear 9 of the rotor 1, on the one hand, and with the teeth 10 of the platform 8, on the other hand. A brush member 13 with a plurality of bristles 14 are fixed on the platform 8.

As can be seen from FIG. 1, the rotor 1 is provided with a through going opening 15 arranged in the region of its axis and communicating with the interior of the brush member 13 or more particularly, with an inner space 16 of the brush member 13. The diameter of the opening 15 is smaller than the distance between the inner ends of the rotor blades.

The inventive brush operates in the following manner. When water under pressure is supplied into the inlet passage 6 it exits from the same under pressure onto the blades, rotates the same and also creates a vortex in the central area between the blades so as to provide for an additional impulse for the blades. The water flows under the base 2 of the rotor 1 through the discharge openings 7 into the bursh member 13 and outwardly of the latter. The brush member 13 connected with the platform 8 rotates from the rotor 1 via the transmission 9,11,10.

Since the central area of the rotor between the blades in the region adjacent to the rotor axis communicates through the opening 15 and the space 16 with the outside air, a negative pressure which tends to form in the central area aspirates the outside air and thereby zone of negative pressure which always forms in the center of a vortex is effectively eliminated or more particularly immediately destroyed after its formation. Thereby the water is not aspirated into the central area of the rotor, as can be seen from FIG. 1. The discharge openings 7 of the housing part 5 are located so that the water passes through the brush member radially outwardly of the central axial zone of the brush member and thereby does not interfere with the aspirated air.

Figure 5:
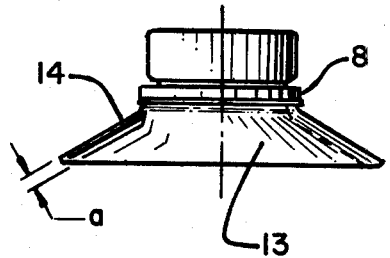
FIG. 5 is a view showing the brush member during the operation of the inventive brush.

As can be seen from FIGS. 4 and 5, a tubular member 17 provided with a water supply passage is connected with the head shown in FIGS. 1-3. The connection is performed via a nut 18 which is screwed onto a threaded part 19 of the head housing, a gasket 20, and a flanged part 21 of the tubular member 17. The tubular member 17 serves as a handle and has two portions 22 and 23 which located at an angle to one another. The portion 23 is connected with the head pivotally with the aid of the above described connection. When the head is pivoted relative to the tubular member 17 as shown in solid lines in FIG. 4, the head and more particularly, the brush member 13 is located inside the angle between the portions 22 and 23. This position is convenient for washing high parts, such as for example a roof of a car. When the head is turned to a position shown in dotted lines in FIG. 4, the brush member 13 is located outside the angle between the portions 22 and 23 which is convenient, for example, for washing sides of a car. In this case the user's hand carrying the tubular member 17 is located at its side opposite to the car.

The tubular member 17 has an elastic wall 24 which together with the outer surface of the tubular member 17 forms a reservoir for a soap-like substance. A pipe 25 with a nozzle 26 extends from the reservoir, and the nozzle 26 is located in the vicinity of the brush member 13. When the user presses the elastic wall 24, the soap-like substance is squeezed from the reservoir through the pipe 25 and the nozzle 26 to the region of the brush member 13.

FIG. 6 shows a special construction of the brush member 13. The bristles of the brush member have such a length and elasticity that with a given number of revolutions of the rotor 1 and the brush member 13, the bristles 14 extends substantially radially and form, at the periphery of the brush member 13 a very thin layer. The thickness of this layer a may be equal to about 2-4 mm. Of course, other thicknesses of this layer are also possible. When the periphery of the brush member has such a small thickness of bristles, the latter can be introduced in very narrow spaces which conventionally are not accesible for known brushes.

The invention is not limited to the details shown since various modifications and structural changes are possible without departing from the spirit of the present invention. What is desired to be protected by Letters Patent is set forth in the appended claims.

I claim:

1. A water brush for cars and the like, comprising
a housing including a generally circular portion;
a water inlet opening for said housing and a water outlet opening for said housing;
a rotor having an axis and mounted within said cylindrical portion of said housing eccentrically with respect to the same, said rotor including a base having a plurality of blades mounted thereon, said blades being so positioned that they are rotated by the force of water exiting said inlet opening, said blades extending substantially radially of said rotor but having a gap between the inner end of each blade and said axis of said rotor providing a means for dissipation of water under pressure thereinto;
a brush member coupled with said rotor for rotation therewith, said eccentric mounting of said rotor providing a steadily increasing spacing between the outer ends of said blades of said rotor and the inner wall of the housing in the area of said generally cylindrical portion; and
means for preventing the formation of a zone of negative pressure near said axis of said rotor, which zone would form otherwise in the absence of such means.

2. A water brush as defined in claim 1, wherein said preventing means includes a passage communicating a region between said blades and near said axis of said rotor with outside air, so that the outside air is aspirated into said region and thereby prevents the formation of said zone of negative pressure.

3. A water brush as defined in claim 2, wherein said base of said rotor has an opening communicating with said region between said blades and near said axis of said rotor, said brush member having a further opening which communicates with said opening of said base of said rotor and the outside of the brush member and thereby with the outside air, said openings together forming said passage of said preventing means.

4. A water brush as defined in claim 2, wherein said outlet opening of said housing includes a plurality of outlet ports arranged so that they are radially spaced from said axis of said rotor and water exits through said brush member at radially spaced locations so as not to interfere with the air aspirated through said passage.

5. A water brush as defined in claim 1; and further comprising a substantially tubular member connected with said housing and provided with a water supply conduit communicating with said inlet opening of said housing, said tubular member having a first portion arranged to be connected with said housing and a second portion extending at an angle to said first portion and arranged to be grasped by a user, said first portion of said tubular member being connected with said housing pivotally between a first position in which said brush member is located inside said angle between said portions and a second position in which said brush member is located outside the same.

6. A water brush as defined in claim 1; and further comprising a substantially tubular member connected with said housing and provided with a water supply conduit communicating with said inlet opening of said housing, and means for supplying a soap-like medium in the region of said brush member, said supplying means including an elastic wall surrounding the outer surface of said tubular member and forming a soap-like medium containing reservoir, and a supply pipe communicating with said reservoir and having an outlet facing toward said region of said brush member, so that upon compressing of said elastic wall, the soap-like medium is squeezed from said reservoir and supplied through said supply pipe into said region.

7. A water brush as defined in claim 1, wherein said rotor together with said brush member rotates with a predetermined number of revolutions, said brush member having a plurality of elongated brushing bristles whose length and elasticity are selected so that a centrifugal force developed at said number of revolutions causes said brushing bristles to extend radially outwardly and to form at the periphery of said brush member a relatively thin layer of said brushing bristles, which can be inserted into narrow spaces.

8. A water brush as defined in claim 7, wherein said layer of said brushing bristles at the periphery of said brush member has a thickness of substantially between 2 and 4 mm.

* * * * *